Figure 1:
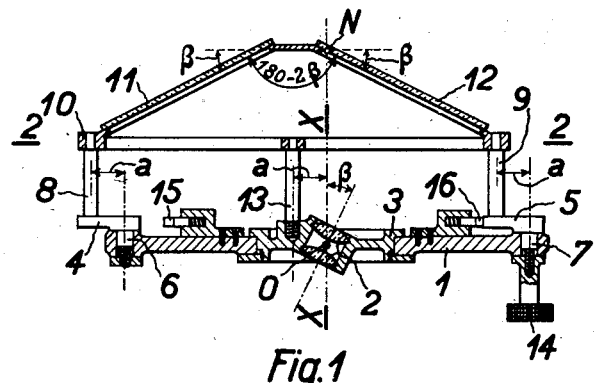

Patented Aug. 8, 1933

1,921,647

UNITED STATES PATENT OFFICE 1,921,647

IMAGE PLATE HOLDING CHAMBER FOR APPARATUS FOR MEASURING PHOTOGRAMS

Walther Bauersfeld and Otto von Gruber, Jena, Germany, assignors to the Firm Carl Zeiss, Jena, Germany Application August 26, 1931, Serial No. 559,503, and in Germany September 3, 1930

3 Claims. (Cl. 88—29)

The invention concerns an image plate holding chamber for apparatus for measuring photograms which is so dimensioned as to permit of inserting several image plates, or films, that were photographed simultaneously by means of a system of a plurality of rigidly connected cameras (for instance by means of a compound or a panorama camera) and in which all image plates have a common objective whose inclination relative to the image holding chamber can be adjusted for successively measuring the image plates.

In image plate holding chambers of this kind the image plates are given such mutual positions that turning the objective alone is sufficient to restore the exposure conditions of each image plate. This requires under any circumstances that the image plates are mutually inclined in the chamber exactly in the same way as they were in the camera. Moreover, the mutual distances the image plates are to be given in the chamber are exactly prescribed. These distances result from the necessity of the optical centre of the objective, which lies in the turning axis of this objective, being for each image plate identical with that point which lies in a line perpendicular to the image plate and passing through the principal point of the image and which is from this image plate at a distance equal to the focal length of the photographing objective.

The invention aims at obviating these restrictions relative to the mutual positions of the image plates in the image plate holding chamber by providing special means that permit the said plates to assume mutual positions other than those referred to above. The new construction permits a substantially greater scope in the construction of the image plate holding chamber. It avoids especially all difficulties inherent in the necessity of also those image points being accessible for measurement which belong to the overlapping parts of the adjacent image plates.

The deviation relative to the mutual positions of the image plates can be compensated by mechanical or optical means. For instance, the image plates may be movable either singly or conjointly (according to the construction of the image holding chamber they may be rotatable or displaceable). If the deviation affects only the mutual distances of the image plates it is advisable to provide these plates on a frame which can be moved relatively to the image holding chamber by means of a steering rod or the like (for instance by means of eccentrics):

In the case of movable image plates the objective and the image plates are conveniently so coupled to each other that changing from the measurement of one image plate to that of another requires only one manipulation.

The compensation by optical means can be effected for instance by glass wedges or plano-parallel glass plates. These optical members may be coordinated to each image plate, which requires them to be fixed to the image plate holding chamber. Plano-parallel plates which are provided near the image plates are especially suitable in this case. If only one system of optical members is to be used for all image plates this system must rotate in the same manner as the objective, for which reason it is conveniently rigidly connected to the objective.

Figures 1 to 7 of the accompanying drawings represent, in part schematically, five constructional examples all of which concern an image plate holding chamber with only two image plates. Of Figures 1 to 3, which illustrate an image plate holding chamber with compensation by mechanical means, Figure 1 shows a vertical section in which the objective and the image plates have such positions that the right hand image plate can be measured, Figure 2 a horizontal section, and Figure 3 a view of a longitudinal section in which the objective and the image plates have such mutual positions as are necessary for measuring the left hand image plate. The other four constructional examples (Figures 4 to 7) represent, each in a vertical section, the compensation by optical means.

Figure 2:
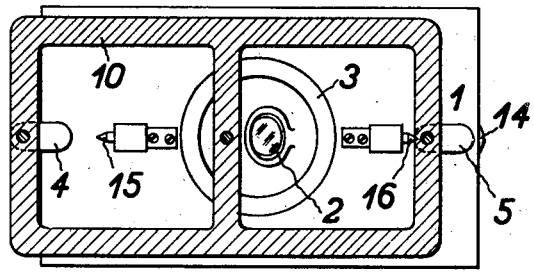
Figure 3:
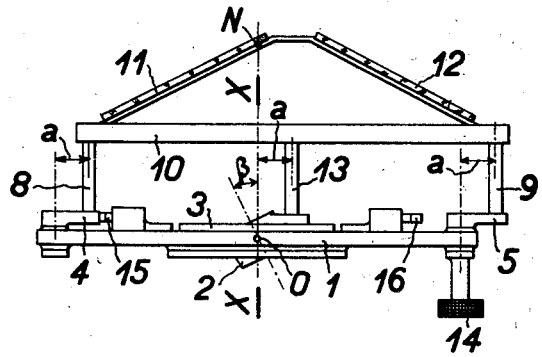

The image plate holding chamber according to Figures 1 to 3 contains a plate 1 on which an objective 2 is mounted for rotation about an axis X—X by means of a bush 3. By means of pins 6 and 7 two cranks 4 and 5, respectively, are provided on the plate 1 in such a way that the axes of these pins are parallel to the axis X—X. These cranks are provided with pins 8 and 9, respectively, the axes of which are also parallel to the axis X—X and are at a distance $a$ from the axes of the appertaining pins 6 and 7, respectively. The pins 8 and 9 support a frame 10 which is given such a form that it is suitable to hold two image plates 11 and 12 each of which is inclined by an angle $\beta$ to a plane perpendicular to the axis X—X in such a way that, together, they enclose an angle of 180°—2$\beta$. The bush 3 supports a pin 13 which goes into the frame 10. The axis of this pin is parallel to the axis X—X and is from the same at the said distance $a$.

The objective 2 is so fixed in the bush 3 that the turning axis X—X of the bush 3 contains the optical centre of the objective 2 and that the optical axis of the objective is inclined to the axis X—X by the said angle β. The image plates 11 and 12 must be so placed on the frame 10 that, when this frame has a certain position, owing to the bush 3 being coupled to the plate 1 by means of the pin 13, the nadir point of one of the two image plates lies in the axis X—X and the optical axis of the objective 2 contains that point of this image plate which, when the photograph was taken, was contained in the optical axis of the camera objective. In Figures 1 and 2 the frame 10 and the bush 3 have that position in which the said conditions hold good for the right hand image plate 12; in Figure 3 the frame 10 and the bush 3 are shown in that position in which the said conditions hold good for the left hand image plate. Figures 1 and 2 therefore represent those positions of the image plates and of the objective in which the right hand image plate 12 can be measured and Figure 3 those positions in which the left hand plate 11 can be measured. Displacing the frame 10 and, consequently, the bush 3 from one position into the other is effected by turning a milled head 14 fixed to the pin 7. The positions of the frame 10 which are required for measuring are secured by locking pins 15 and 16, respectively, which are provided on the plate 1 and go into one of the two cranks 4 and 5 (in Figures 1 and 2 the locking pin 16 goes into crank 5, in Figure 3 the pin 15 into crank 4). The plate 1 is to be asumed to be disposed for instance on the frame of an instrument for evaluating air images in such a way that it can be secured in such a position that the inclination of the image plates 11 and 12 in the space corresponds to the inclination which the plate had when the photograph was taken.

Figure 4:
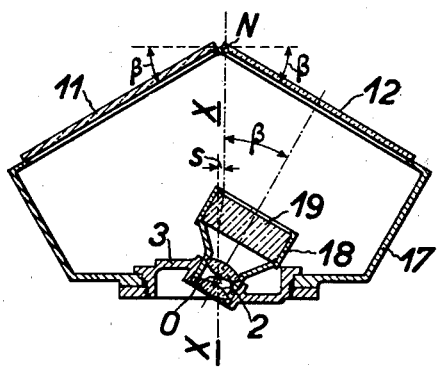

In the image plate holding chamber according to Figure 4 the casing is designated 17. A planoparallel glass plate 19 is rigidly connected to the objective 2 by means of a mount 18 in such a manner that its plano-parallel surfaces are perpendicular to the optical axis of the objective 2. In a bush 3 which is mounted on the casing 17 for rotation about an axis X—X the mount 18 is fixed in such a manner that the optical centre O of the objective 2 lies in the axis X—X and that the optical axis of the objective is inclined by the angle β to the axis of rotation X—X. The image plates 11 and 12 are so arranged on the casing 17 that they enclose an angle 180°—2β and are each inclined by an angle β to a plane perpendicular to the axis X—X.

A ray entering the objective 2 in the direction of the axis X—X is displaced by means of the glass plate 19 parallel to itself by a value s and, when the objective 2 takes that position in which its optical axis intersects one of the two image plates 11 and 12 in that point which the optical axis of the objective of the camera contained during the exposure, the said ray must contain the nadir point N of this image plate.

The annexed drawings illustrate that position of the objective 2 which is required for evaluating the image plate 12. In order to be in a position to measure the image plate 11 the bush 3 must be turned about the axis X—X by 180°. Corresponding locking devices are to be assumed to secure the correct positions of the sleeve 3.

Figure 5:
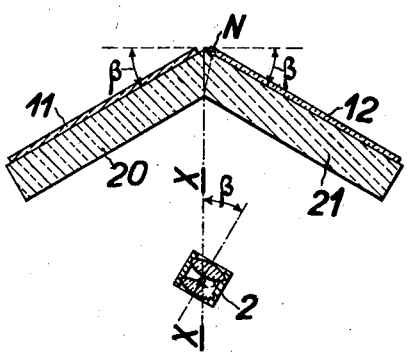

The schematically represented image plate holding chamber according to Figure 5 differs from the one according to Figure 4 only in that the single plano-parallel glass plate 19 which is rigidly connected to the objective 2 and consequently partakes of the revolutions of same is replaced by two such glass plates, 20 and 21, which belong to the two image plates 11 and 12 and are to be assumed to be fixed to the casing of the image plate holding chamber.

Figure 6:
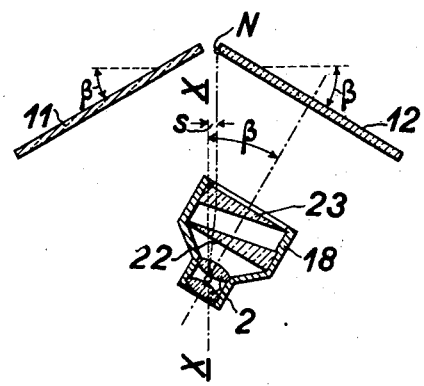

The schematically represented image plate holding chamber according to Figure 6 differs from the one according to Figure 4 only in that the objective 2 has not the plano-parallel glass plate 19 but two glass wedges 22 and 23 which have the same effect as the said glass plate 19.

Figure 7:
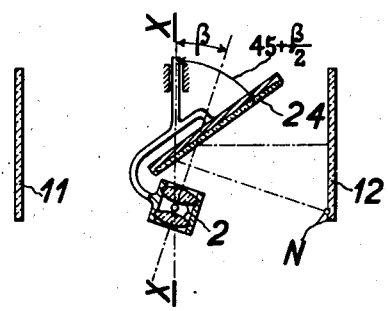

Figure 7 schematically represents an image plate holding chamber in which, contrary to the image plate holding chambers mentioned hereinbefore, the image plates 11 and 12 are parallel to each other and to the turning axis X—X of the objective. It is assumed that during the exposure the plates had the same positions as they were assumed to have had in the case of the image plate holding chambers described hereinbefore. The altered positions of the image plates are made possible by a mirror 24 which is rigidly connected to the objective 2 in such a manner that it is inclined to the turning axis X—X of the objective 2 by means of an angle $45+\beta/2$.

We claim:

1. A chamber for apparatus for viewing photograms, a group of image plates lying in different planes and being supported by the said chamber, one single objective rotatably mounted on the said chamber about an axis which is inclined against the optical axis of this objective, and means for adjusting at least one of the image plates of the said group relatively to the said objective in a plane at right angles to the axis of rotation of the said objective.

2. A chamber for apparatus for viewing photograms, comprising a frame, a group of image plates lying in different planes and being supported by the said frame, one single objective rotatably mounted on the said chamber about an axis which is inclined against the optical axis of this objective, and means for adjusting the said frame relatively to the said objective in a plane at right angles to the axis of rotation of the said objective.

3. A chamber for apparatus for viewing photograms, a group of image plates lying in different planes and being supported by the said chamber, one single objective rotatably mounted on the said chamber about an axis which is inclined against the optical axis of this objective, means for adjusting at least one of the image plates of the said group relatively to the said objective in a plane at right angles to the axis of rotation of the said objective, and means for coupling the said objective and the adjustably disposed image plates with each other in such a manner that changing from the viewing of one image plate to that of another requires only one manipulation.

WALTHER BAUERSFELD.
OTTO v. GRUBER.